(12) United States Patent
Yoshida et al.

(10) Patent No.: US 10,673,629 B2
(45) Date of Patent: Jun. 2, 2020

(54) DATA TRANSMISSION AND RECEPTION METHOD AND SYSTEM

(71) Applicant: NIPPON TELEGRAPH AND TELEPHONE CORPORATION, Chiyoda-ku (JP)

(72) Inventors: Reo Yoshida, Musashino (JP); Hitoshi Fuji, Musashino (JP); Tetsutaro Kobayashi, Musashino (JP); Tomohide Yamamoto, Musashino (JP); Yuto Kawahara, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 15/568,917

(22) PCT Filed: Apr. 20, 2016

(86) PCT No.: PCT/JP2016/062554
§ 371 (c)(1),
(2) Date: Oct. 24, 2017

(87) PCT Pub. No.: WO2016/175105
PCT Pub. Date: Nov. 3, 2016

(65) Prior Publication Data
US 2018/0115414 A1    Apr. 26, 2018

(30) Foreign Application Priority Data

Apr. 30, 2015    (JP) .................. 2015-092712

(51) Int. Cl.
*H04L 29/06* (2006.01)
*H04L 9/08* (2006.01)
*H04L 9/16* (2006.01)

(52) U.S. Cl.
CPC .............. *H04L 9/0891* (2013.01); *H04L 9/08* (2013.01); *H04L 9/16* (2013.01); *H04L 63/062* (2013.01);
(Continued)

(58) Field of Classification Search
CPC ..................................................... H04L 9/0891
See application file for complete search history.

(56) References Cited

U.S. PATENT DOCUMENTS

| 9,722,976 B1 * | 8/2017 | Li ........................ H04L 63/0428 |
| 2006/0230445 A1 * | 10/2006 | Huang .............. H04W 12/0013 726/15 |

(Continued)

FOREIGN PATENT DOCUMENTS

| EP | 1 921 792 A1 | 5/2008 |
| JP | 2002-252607 A | 9/2002 |

(Continued)

OTHER PUBLICATIONS

RFC 3265: Session Initiation Protocol (SIP)—Specific Event Notification, Network Working Group, A. B. Roach, The Internet Society, Jun. 2002, 38 pages.*

(Continued)

*Primary Examiner* — Victor Lesniewski
(74) *Attorney, Agent, or Firm* — Oblon, McClelland, Maier & Neustadt, L.L.P.

(57) ABSTRACT

A server sends a key update request for requesting updating of the key, to a client terminal. The client terminal sends, to a key delivery server, a key delivery request for requesting the delivery of a key to the client terminal. The key delivery server delivers a key to the client terminal. The client terminal sends, to the server, a key reception notice indicating that the delivered key was received. The server sends, to the client terminal, a key-use start notice indicating that the (Continued)

client terminal starts data transmission and reception by using the delivered key with a different client terminal from the aforementioned client terminal. The client terminal performs data transmission and reception with the different client terminal by using the delivered key.

5 Claims, 4 Drawing Sheets

(52) U.S. Cl.
CPC ........ *H04L 63/068* (2013.01); *H04L 65/1006* (2013.01)

(56) References Cited

U.S. PATENT DOCUMENTS

| | | | |
|---|---|---|---|
| 2008/0010688 A1* | 1/2008 | Cai | H04L 63/20 726/28 |
| 2008/0025516 A1* | 1/2008 | Masuhiro | H04L 63/0428 380/279 |
| 2008/0028204 A1* | 1/2008 | Masuhiro | H04L 29/06027 713/152 |
| 2008/0219445 A1* | 9/2008 | Yato | H04L 63/0428 380/255 |
| 2009/0034736 A1* | 2/2009 | French | H04L 63/062 380/278 |
| 2009/0041006 A1* | 2/2009 | Chiu | H04L 29/06027 370/352 |
| 2009/0300189 A1* | 12/2009 | Takeda | H04L 67/14 709/227 |
| 2010/0223463 A1 | 9/2010 | Sakaguchi et al. | |
| 2010/0223465 A1* | 9/2010 | Matsui | G07C 9/00857 713/168 |
| 2010/0268937 A1 | 10/2010 | Blom et al. | |
| 2010/0281251 A1* | 11/2010 | Arauz Rosado | H04L 12/4641 713/152 |
| 2011/0131414 A1* | 6/2011 | Cheng | H04L 63/06 713/170 |
| 2016/0056959 A1 | 2/2016 | Blom et al. | |

FOREIGN PATENT DOCUMENTS

| | | |
|---|---|---|
| JP | 2004-248169 A | 9/2004 |
| JP | 2007-43598 A | 2/2007 |
| JP | 2016-134826 A | 7/2016 |
| WO | WO 2009/070075 A1 | 6/2009 |

OTHER PUBLICATIONS

Zhang, Liping; Tang, Shanyu; Cai, Zhihua; "Robust and efficient password authenticated key agreement with user anonymity for session initiation protocol-based communications", IET Communications, vol. 8, Issue 1, Feb. 20, 2014, pp. 83-91.*

Gurbani, Vijay K.; Kolesnikov, Vladimir; "A Survey and Analysis of Media Keying Techniques in the Session Initiation Protocol (SIP)", IEEE Communications Surveys & Tutorials, vol. 13, Issue 2, May 27, 2010, pp. 183-198.*

Extended European Search Report dated Nov. 2, 2018 in Patent Application No. 16786382.8, citing documents AA-AB, AO-AP, & AX therein, 9 pages.

"3rd Generation Partnership Project; Technical Specification Group Services and System Aspects: IP Multimedia Subsystem (IMS) media plane security (Release 12)", 3GPP TS 33.328 V12.8.0, 2014, XP050907390, pp. 1-71.

Office Action dated Jan. 8, 2019 in Japanese Patent Application No. 2017-515504 (with English translation).

Zimmerman, P., et al., "ZRTP: Media Path Key Agreement for Unicast Secure RTP", RFC 6189, Zfone Project, Internet Engineering Task Force (IETF), Apple, Inc., Apr. 2011, pp. 1-115.

International Search Report dated Aug. 2, 2016 in PCT/JP2016/062554 filed Apr. 20, 2016.

Office Action dated Dec. 24, 2019 in Chinese Application No. 201680023948.6 (w/English translation).

* cited by examiner

DATA TRANSMISSION AND RECEPTION METHOD AND SYSTEM

TECHNICAL FIELD

The present invention relates to a technique for transmitting and receiving data between or among information processing devices, such as smartphones or personal computers, with key exchange.

BACKGROUND ART

RFC 6189 describes a key exchange technique used for cryptographic communication in which the SIP protocol is used (see Non-Patent Literature 1, for example).

PRIOR ART LITERATURE

Non-Patent Literature

Non-patent literature 1: RFC 6189

SUMMARY OF THE INVENTION

Problems to be Solved by the Invention

The key exchange technique described in Non-Patent Literature 1 uses a fixed timing for exchanging keys. A technique for exchanging keys regularly at a desired timing is not yet known.

Means to Solve the Problems

An object of the present invention is to provide a data transmission and reception method and system that allow data to be transmitted and received with key exchange at a timing other than the timing for key exchange specified in RFC 6189.

A data transmission and reception method according to one aspect of the present invention includes a key update request step of sending a key update request for requesting updating of a key, to a client terminal from a server; a key delivery request step of sending a key delivery request for requesting the delivery of a key to the client terminal, to a key delivery server from the client terminal after the client terminal receives the key update request; a key delivery step of delivering a key to the client terminal from the key delivery server after the key delivery server receives the key delivery request; a key reception notice step of sending a key reception notice indicating that the delivered key was received, to the server from the client terminal after the client terminal receives the delivered key; a key-use start notice step of sending a key-use start notice indicating that the client terminal starts data transmission and reception by using the delivered key with a different client terminal from the client terminal, to the client terminal from the server after the server receives the key reception notice; and a data transmission and reception step of performing data transmission and reception between the client terminal and the different client terminal by using the delivered key after the client terminal receives the key-use start notice.

Effects of the Invention

Data can be transmitted and received with key exchange at a timing other than the timing for key exchange specified in RFC 6189.

DETAILED DESCRIPTION OF THE EMBODIMENTS

Embodiment

A data transmission and reception system and method according to one embodiment of the present invention will be described below with reference to the drawings.

A data transmission and reception system according to a first embodiment includes a client terminal 1, an SIP server 2, and a key delivery server 3, for example. The client terminal 1 is an information processing device, such as a mobile phone, a smartphone, a tablet terminal, or a personal computer. The SIP sever 2 performs processing according to the Session Initiation Protocol (SIP). The key delivery server 3 delivers a key to the client terminal 1.

Step 1

The SIP server 2 sends a key update request for requesting updating of the key, to the client terminal 1 (Step S1).

Figure 1:
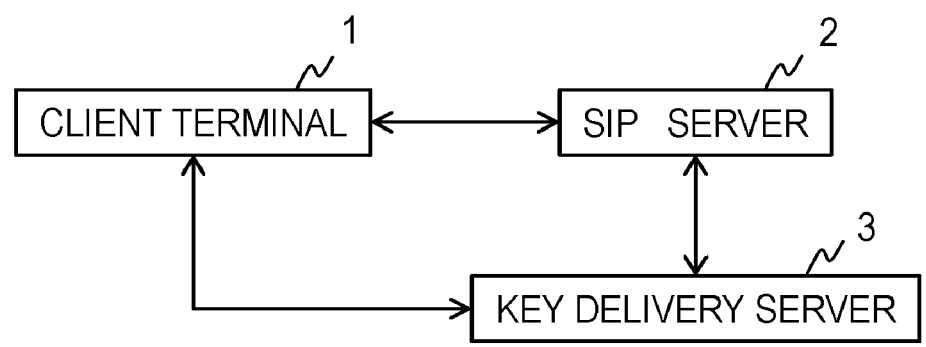
FIG. 1 is a block diagram showing an example data transmission and reception system.
Figure 2:
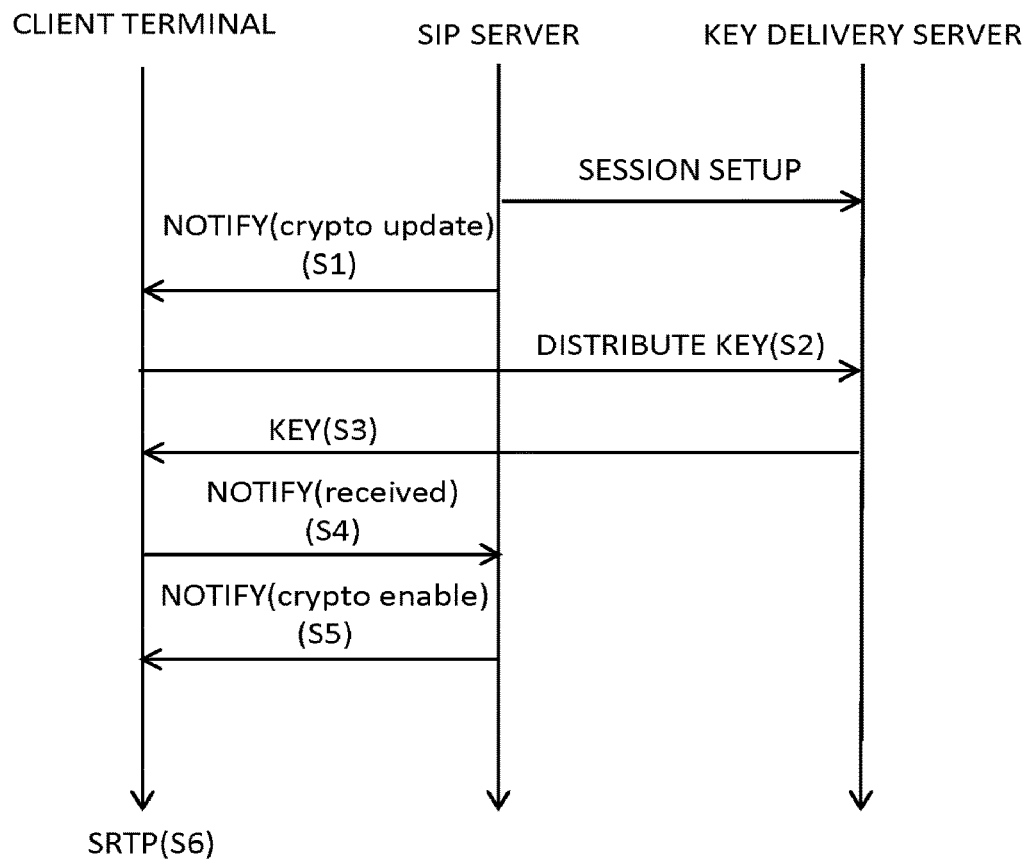
FIG. 2 is a sequence chart showing an example data transmission and reception method.

In FIG. 2, the key update request is indicated by "crypto update". "NOTIFY (crypto update)" in FIG. 2 shows an example key-update-request transmission in which the key update request is sent together with a message based on a NOTIFY method in the SIP protocol.

Here, "xxx is sent together with a message based on a yyy method" means, for example, that xxx may be sent as a part of the message based on the yyy method. For example, xxx is written in the BODY part of the message based on the yyy method.

The SIP server 2 can make this key update request at any timing. For example, the SIP server 2 may do it when the client terminal 1 starts data transmission and reception with another client terminal or after the client terminal 1 starts data transmission and reception with another client terminal, as described later.

The SIP server 2 may also regularly send a key update request. More specifically, the SIP server 2 may monitor time and send a key update request at a predetermined time.

In the example shown in FIG. 2, the key update request is sent to one client terminal 1. Actually, the key update request is also sent to another client terminal that performs data transmission and reception with the client terminal 1.

Step 2

After receiving the key update request, the client terminal 1 sends, to the key delivery server 3, a key delivery request for requesting the delivery of a key to the client terminal 1 (Step S2). In FIG. 2, the key delivery request is indicated by "DISTRIBUTE KEY".

After receiving the key update request, the other client terminal also sends a key delivery request to the key delivery server 3.

Step S3

After receiving the key delivery request, the key delivery server 3 sends a key to the client terminal 1 (step S3).

In FIG. 2, the delivery of the key is indicated by "KEY".

After receiving the key delivery request from the other client terminal, the key delivery server 3 also sends a key to the other client terminal.

A key sent to a client terminal may have a number for identifying the key attached thereto. That number may be a number used by a master identifier in SRTP. When the key is updated by the processing from step S1 to step S4, for example, the number may be incremented by 1 every time the key is updated.

Step 4

After receiving the delivered key, the client terminal 1 sends, to the SIP server 2, a key reception notice indicating that the delivered key was received (step S4).

In FIG. 2, the key reception notice is indicated by "received". "NOTIFY (received)" in FIG. 2 shows an example key-reception-notice transmission in which the key reception notice is sent together with a message based on a NOTIFY method in the SIP protocol.

After receiving the delivered key, the other client terminal also sends a key reception notice to the SIP server 2.

Step 5

After receiving the key reception notices, the SIP server 2 sends, to the client terminal 1, a key-use start notice indicating that the client terminal 1 starts data transmission and reception with the other client terminal, different from the client terminal 1, by using the delivered keys (step S5).

In FIG. 2, the key-use start notice is indicated by "crypto enable". "NOTIFY (crypto enable)" in FIG. 2 shows an example key-use-start-notice transmission in which the key-use start notice is sent together with a message based on a NOTIFY method in the SIP protocol.

The SIP server 2 also sends a key-use start notice to the other client.

To identify the key to be used, a key-use start notice may have a number of the key attached thereto.

Step 6

After receiving the key-use start notice, the client terminal 1 performs data transmission and reception with the other client terminal by using the delivered keys (step S6).

"SRTP" in FIG. 2 shows an example of data transmission and reception between the client terminal 1 and the other client terminal by using the SRTP protocol.

Before the processing in step S1, the SIP server 2 may send, to the key delivery server 3, a key delivery preparation notice indicating the preparation of key delivery. In FIG. 2, the key delivery preparation notice is indicated by "SESSION SETUP".

A key delivery preparation notice includes, for example, the public key of the client terminal 1 and the public key of the other client terminal. The key delivery server 3 may encrypt the delivery of the key in step S3 by using these public keys. For example, to deliver the key to the client terminal 1, the key delivery server 3 encrypts the key with the public key of the client terminal 1 and sends the encrypted key to the client terminal 1. In that case, the client terminal 1 decrypts the received encrypted key with the private key of the client terminal 1 to obtain the key. The key may be delivered to the client terminal by the method described in the specification of Japanese Patent Application No. 2015-9271.

Example Sequences

The processing from step S1 to step S6, described above, can be performed at any timing in an SIP-protocol sequence. For example, the processing from step S1 to step S6 can be performed at the timings shown in the sequence shown in FIG. 3 or FIG. 4.

Figure 3:
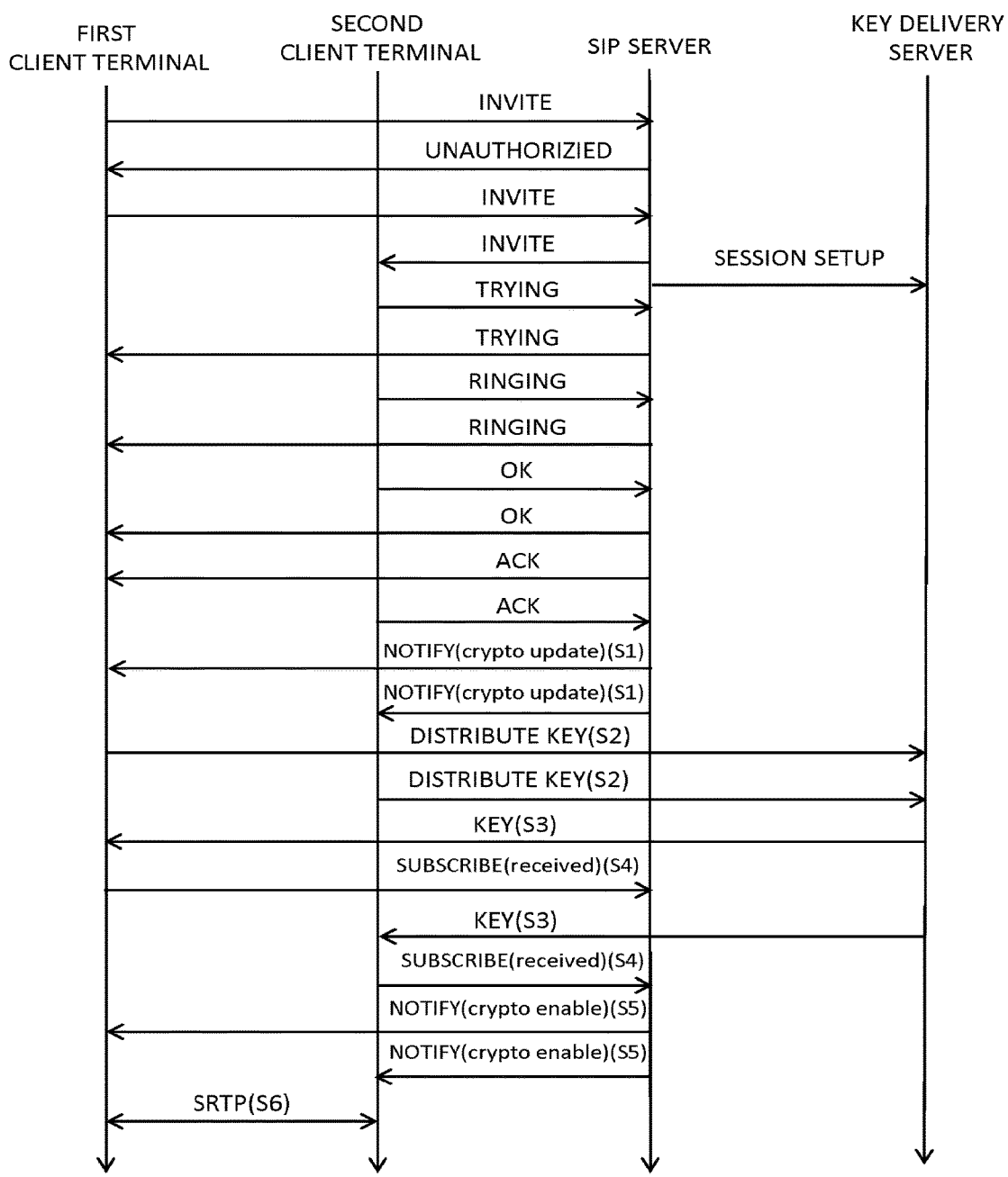
FIG. 3 is a sequence chart showing the example data transmission and reception method.
Figure 4:
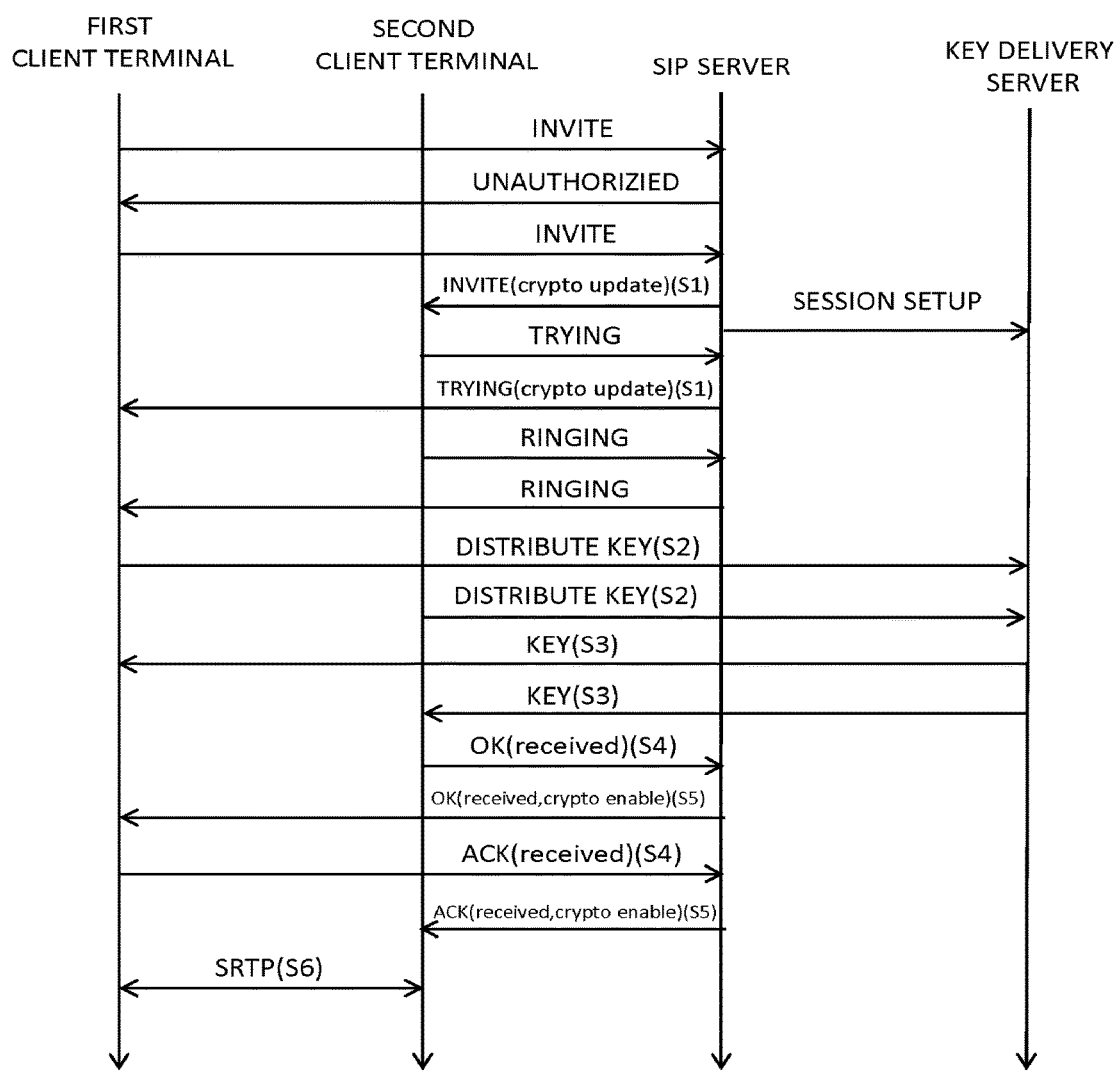
FIG. 4 is a sequence chart showing the example data transmission and reception method.

In the sequences shown in FIG. 3 and FIG. 4, the client terminal 1 is indicated by "the first client terminal" and the other client terminal, which performs data transmission and reception with the client terminal 1, is indicated by "the second client terminal".

In the sequence shown in FIG. 3, after performing transmission and reception of a message based on an INVITE method in the SIP protocol, the SIP server 2 sends a key delivery preparation notice (SESSION SETUP) to the key delivery server 3. In addition, after performing transmission and reception of a message based on an ACK method in the SIP protocol, in other words, after a session has been set up, the SIP server 2 sends a key update request (crypto update) to the first client terminal and the second client terminal together with a message based on a NOTIFY method in the SIP protocol (step S1). Then, the first client terminal and the second client terminal send a key update request (DISTRIBUTE KEY) to the key delivery server 3 (step S2), and the key delivery server 3 sends a key (KEY) to the first client terminal and the second client terminal (step S3). Then, the first client terminal and the second client terminal send a key reception notice (received) to the SIP server 2 together with a message based on a SUBSCRIBE method in the SIP protocol (step S4). Then, the SIP server 2 sends a key-use start notice (crypto enable) together with a message based on a NOTIFY method in the SIP protocol to the first client terminal and the second client terminal (step S5). Then, the first client terminal and the second client terminal use the delivered keys and SRTP protocol to perform data transmission and reception (step S6).

In the sequence shown in FIG. 4, the SIP server 2 sends a key update request (crypto update) to the first client terminal together with a return message based on an INVITE method in the SIP protocol (step S1). Then, the SIP server 2 sends a key delivery preparation notice (SESSION SETUP) to the key delivery server 3. The SIP server 2 also sends a key update request (crypto update) to the second client terminal together with a return message based on a TRYING method in the SIP protocol (step S1). After performing transmission and reception of a message based on a RINGING method in the SIP protocol, the first client terminal and the second client terminal send a key update request (DISTRIBUTE KEY) to the key delivery server 3 (step S2), and the key delivery server 3 sends a key (KEY) to the first client terminal and the second client terminal (step S3). Then, the second client terminal sends a key reception notice (received) to the SIP server 2 together with a message based on an OK method in the SIP protocol (step S4). Then, the SIP server 2 sends a key-use start notice (crypto enable) and the key reception notice (received) received from the second client terminal, together with a message based on an OK method in the SIP protocol to the first client terminal (step S5). Then, the first client terminal sends a key reception notice (received) to the SIP server 2 together with a message based on an ACK method in the SIP protocol (step S4). Then, the SIP server 2 sends a key-use start notice (crypto enable) and the key reception notice (received) received from the first client terminal, together with a message based on an ACK method in the SIP protocol to the second client terminal (step S5). Then, the first client terminal and the second client terminal use the delivered keys and SRTP protocol to perform data transmission and reception (step S6).

In this manner, the key can be exchanged regularly at any timing in the above-described data transmission and reception method and system. Therefore, according to the above-described data transmission and reception method and system, the key can be exchanged at a timing other than the key exchange timing specified in RFC 6189, and data transmission and reception can be performed.

Program, Recording Medium, and Modification

The SIP server 2 may be a third-party server that is not an entity performing cryptographic communication.

When the processing performed in each of the client terminal 1, the SIP server 2, and the key delivery server 3 is implemented by a computer, the processing details of the functions that should be provided by each device are described in a program. When the program is executed by a computer, the processing is implemented on the computer.

The program containing the processing details can be recorded in a computer-readable recording medium. The computer-readable recording medium can be any type of medium, such as a magnetic recording device, an optical disc, a magneto-optical recording medium, or a semiconductor memory.

Each processing unit may be implemented by executing a predetermined program on the computer. At least a part of the processing details may be implemented by hardware.

In addition, it is needless to say that appropriate changes can be made to the above embodiment without departing from the scope of the present invention.

What is claimed is:

1. A data transmission and reception method comprising:
   a key update request step of sending a key update request for requesting updating of a key, to a client terminal from a server, together with a message based on a NOTIFY method in the SIP protocol;
   a key delivery request step of sending a key delivery request for requesting the delivery of a key to the client terminal, to a key delivery server from the client terminal after the client terminal receives the key update request;
   a key delivery step of delivering a key to the client terminal from the key delivery server after the key delivery server receives the key delivery request;
   a key reception notice step of sending a key reception notice indicating that the delivered key was received, to the server from the client terminal, together with a message based on a SUBSCRIBE method in the SIP protocol, after the client terminal receives the delivered key;
   a key-use start notice step of sending a key-use start notice indicating that the client terminal starts data transmission and reception by using the delivered key with a different client terminal from the client terminal, to the client terminal from the server, together with a message based on a NOTIFY method that is different from the message based on the NOTIFY method in the SIP protocol, after the server receives the key reception notice; and
   a data transmission and reception step of performing data transmission and reception between the client terminal and the different client terminal by using the delivered key after the client terminal receives the key-use start notice,
   wherein the key update request is sent to the client terminal without going through the key delivery server.

2. A data transmission and reception method comprising:
   a key update request step of sending a key update request for requesting updating of a key, to a client terminal from a server, together with a message based on an INVITE method in the SIP protocol;
   a key delivery request step of sending a key delivery request for requesting the delivery of a key to the client terminal, to a key delivery server from the client terminal after the client terminal receives the key update request;
   a key delivery step of delivering a key to the client terminal from the key delivery server after the key delivery server receives the key delivery request;
   a key reception notice step of sending a key reception notice indicating that the delivered key was received, to the server from the client terminal, together with a message based on an ACK method in the SIP protocol, after the client terminal receives the delivered key;
   a key-use start notice step of sending a key-use start notice indicating that the client terminal starts data transmission and reception by using the delivered key with a different client terminal from the client terminal, to the client terminal from the server, together with a message based on an ACK method that is different from the message based on the ACK method in the SIP protocol, after the server receives the key reception notice; and
   a data transmission and reception step of performing data transmission and reception between the client terminal and the different client terminal by using the delivered key after the client terminal receives the key-use start notice,
   wherein the key update request is sent to the client terminal without going through the key delivery server.

3. The data transmission and reception method according to one of claim 1 or 2, wherein the server is a SIP server.

4. A data transmission and reception system comprising a client terminal, a server, and a key delivery server,
   wherein the server sends a key update request for requesting updating of a key, to the client terminal, together with a message based on a NOTIFY method in the SIP protocol,
   the client terminal sends a key delivery request for requesting the delivery of a key to the client terminal, to the key delivery server after the client terminal receives the key update request,
   the key delivery server delivers a key to the client terminal after the key delivery server receives the key delivery request,
   the client terminal sends a key reception notice indicating that the delivered key was received, to the server, together with a message based on a SUBSCRIBE method in the SIP protocol, after the client terminal receives the delivered key,
   the server sends a key-use start notice indicating that the client terminal starts data transmission and reception by using the delivered key with a different client terminal from said client terminal, to the client terminal, together with a message based on a NOTIFY method that is different from the message based on the NOTIFY method in the SIP protocol, after the server receives the key reception notice, and
   the client terminal performs data transmission and reception by using the delivered key with the different client terminal after the client terminal receives the key-use start notice,
   wherein the key update request is sent to the client terminal without going through the key delivery server.

5. A data transmission and reception system comprising a client terminal, a server, and a key delivery server,
   wherein the server sends a key update request for requesting updating of a key, to the client terminal, together with a message based on an INVITE method in the SIP protocol, the client terminal sends a key delivery request for requesting the delivery of a key to the client terminal, to the key delivery server after the client terminal receives the key update request, the key delivery server delivers a key to the client terminal after the key delivery server receives the key delivery request, the client terminal sends a key reception notice indicating that the delivered key was received, to the server, together with a message based on an ACK method in the SIP protocol, after the client terminal receives the delivered key, the server sends a key-use start notice indicating that the client terminal starts data transmission and reception by using the delivered key with a different client terminal from said client terminal, to the client terminal, together with a message based on an ACK method that is different from the message based on the ACK method in the SIP protocol, after the server receives the key reception notice, and the client terminal performs data transmission and reception by using the delivered key with the different client terminal after the client terminal receives the key-use start notice, wherein the key update request is sent to the client terminal without going through the key delivery server.

* * * * *